United States Patent
Nehl et al.

(10) Patent No.: US 6,404,150 B1
(45) Date of Patent: Jun. 11, 2002

(54) ACCESSORY MOTOR DRIVE POWER SUPPLY SYSTEM FOR AN ELECTRIC VEHICLE

(75) Inventors: Thomas Wolfgang Nehl, Shelby Township, Macomb County; Malakondaiah Naidu, Troy; Avoki Omekanda; Anita B. Rao, both of Rochester Hills, all of MI (US); Lateef A. Kajouke, San Pedro; Mark M. Osugi, Signal Hill, both of CA (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/604,439

(22) Filed: Jun. 27, 2000

(51) Int. Cl.$^7$ .................................................. H02P 7/68
(52) U.S. Cl. .............................. 318/34; 318/51; 318/53; 318/59; 318/68; 318/111; 318/112; 323/203; 363/41; 363/102
(58) Field of Search .............................. 318/34, 51, 53, 318/59, 66, 67, 111, 112; 363/41, 102, 65

(56) References Cited

U.S. PATENT DOCUMENTS

| | | | |
|---|---|---|---|
| 4,472,666 A | * 9/1984 | Akeda et al. | 318/254 |
| 5,323,102 A | * 6/1994 | Torii et al. | 322/90 |
| 5,506,483 A | * 4/1996 | McCann et al. | 318/444 |
| 5,583,751 A | * 12/1996 | Nakazawa et al. | 363/20 |
| 5,751,150 A | * 5/1998 | Rippel et al. | 324/537 |

OTHER PUBLICATIONS

Pending U.S. Patent Application, Serial No. 09/345,268, entitled "High Efficiency Distributed Staged Power System and Control Methods for Electric Vehicle Accossories Power," assigned to the assignee of the present invention.

Pending U.S. Patent Application, Serial No. 09/345,278, entitled "High Efficiency, Distributed Staged Power System Architecture for Electric Vehicle Accessories Power," assigned to the assignee of the present invention.

* cited by examiner

*Primary Examiner*—Robert E. Nappi
*Assistant Examiner*—Rita Leykin
(74) *Attorney, Agent, or Firm*—Anthony Luke Simon

(57) ABSTRACT

An electric vehicle accessory motor drive power supply system (40) that utilizes a single power supply design to provide efficient variable speed motor control to both brushless and brush-type DC motors (42,44). The power supply system includes at least one of each type of motor along with a first DC-DC converter (46) that provides operating power to the brushless motor (42) and a second DC-DC converter (48) that provides operating power to the brush-type motor (44). Both converters (46,48) have a power input (52) connected to the electric vehicle's high voltage bus (50) and each includes a data input (54) for receiving a speed control signal (SC) indicative of desired motor speed, as well as an output (56) for providing a motor drive signal to its associated DC motor (42,44). Each of the converters (46,48) is operable in response to its received speed control signal to convert operating power from the high voltage bus (50) into a lower voltage variable motor drive signal that is provided to its associated motor (42,44) via its output (56). The variable drive signal can be either a variable DC voltage signal or a pulse-width modulated signal. With this arrangement, a single converter design, including a single speed control interface, can be utilized to operate both brush-type and brushless motors. Furthermore, the system permits more efficient operation of the brushless motors since it obviates the need for speed control electronics on the motor itself and therefore eliminates the relatively inefficient use of cascaded PWM stages.

10 Claims, 2 Drawing Sheets

ACCESSORY MOTOR DRIVE POWER SUPPLY SYSTEM FOR AN ELECTRIC VEHICLE

TECHNICAL FIELD

The present invention relates to power supply systems used to operate lower voltage accessory motor drives on an electric vehicle (including battery, hybrid, and fuel cell vehicles) using power drawn from a high voltage bus.

BACKGROUND OF THE INVENTION

Electric vehicles are most widely known for their use of electric motors to provide drive power to the vehicle wheels. However, these vehicles commonly use various accessory drive motors to operate a variety of different vehicle systems. Some examples of these accessory drive motors include liquid coolant pumps, traction control motors, climate control compressor motors, electronic power steering pumps, as well as blowers and other fans. The accessory motors can be either brush-type or brushless DC electric motors and are available at the 350–400 Vdc ratings needed to operate from the high voltage buses typically used on electric vehicles. However, this high voltage operation raises a number of concerns including arcing and other commutation problems with use of the conventional brush-type DC motors. Accordingly, lower voltage motors are sometimes used that can be driven from an intermediate voltage power bus operating at, for example, a fixed 42 Vdc. This lower voltage supply can be produced using a DC-DC converter that draws operating power from the high voltage bus and develops the fixed 42 v supply using conventional DC-DC conversion techniques. Both brush-type and brushless DC motors can be connected to this intermediate bus for safer, more reliable operation.

Many of the vehicle systems operated by these accessory drive motors require a variable speed output of the motor. For brush-type DC motors operating off a fixed intermediate voltage, speed control is typically accomplished using an external speed control module that is connected between the intermediate bus and motor. The speed control module receives a speed control signal from the appropriate controller for the system being operated by the motor, and this control signal is used by the speed control module to vary the DC voltage provided to the motor. For brushless DC motors operating off the fixed intermediate voltage, the speed control signal is provided to a set of speed control electronics incorporated into the motor itself. This arrangement, while permitting operation of the different types of DC motors from a lower voltage supply, nonetheless has a number of inherent disadvantages. First, operation of the different motors from a fixed supply with separate speed control modules and/or electronics is unnecessarily inefficient in terms of power usage, especially at lower loads and speeds. This is due in part to the common practice of using two, cascaded pulse width modulated (PWM) stages—one in the DC-DC converter and the other in the speed control circuitry. Secondly, the use of an external speed control module for the brush-type motors adds to the overall system cost and requires additional space within the vehicle. Similarly, the use of a brushless DC motor with this system requires a more expensive motor having the speed control electronics built in.

Another known system design that provides increased operating efficiency and perhaps somewhat lower cost involves the use of different DC-DC converters for the two different types of DC motors. In this system, the brushless motors are operated in the same manner as described above, using a fixed intermediate supply with speed control being provided by the motor itself. However, the brush-type motors are operated each with a dedicated DC voltage supply having a variable output that is determined in accordance with the speed control signal. This eliminates the need for the external speed control module and the concomitant second PWM stage. However, while this system design may improve cost and efficiency somewhat, it still suffers from some of the same disadvantages as the first system topology described above; namely, it requires different supplies for the different types of motors, uses two cascaded PWM stages for the brushless motors, and utilizes a more expensive brushless motor having integral speed control electronics.

It is therefore a general object of this invention to provide an accessory motor drive power supply system having a simplified, low cost design that provides improved power efficiency over conventional designs. It is also preferably an object of this invention to provide such a power supply system that permits speed control of both brush-type and brushless motors using a uniform speed control interface for the various vehicle systems involved.

SUMMARY OF THE INVENTION

In accordance with the present invention there is provided an electric vehicle power supply system that utilizes a single power supply design to provide efficient, variable speed motor control to both brush-type and brushless DC motors. The power supply system includes at least one brush-type and brushless DC motor along with a first DC-DC converter that provides operating power to the brushless DC motor and a second DC-DC converter that provides operating power to the brush-type DC motor. Both converters have a power input connected to the electric vehicle's high voltage bus and each includes a data input for receiving a speed control signal indicative of desired motor speed, as well as an output for providing a motor drive signal to its associated DC motor. Each of the converters is operable in response to its received speed control signal to convert operating power from the high voltage bus into a lower voltage variable motor drive signal that is provided to its associated motor. The variable drive signal can be either a variable DC voltage signal or a PWM signal.

With this arrangement, a single converter design, including a single speed control interface, can be utilized to operate both brush-type and brushless DC motors. Furthermore, the system permits more efficient operation of the brushless DC motors since it obviates the need for speed control electronics on the motor itself and, in doing so, eliminates the relatively inefficient use of cascaded PWM stages.

BRIEF DESCRIPTION OF THE DRAWINGS

Preferred exemplary embodiments of the present invention will hereinafter be described in conjunction with the appended drawings, wherein like designations denote like elements, and.

DESCRIPTION OF THE PREFERRED EMBODIMENT

Figure 1:
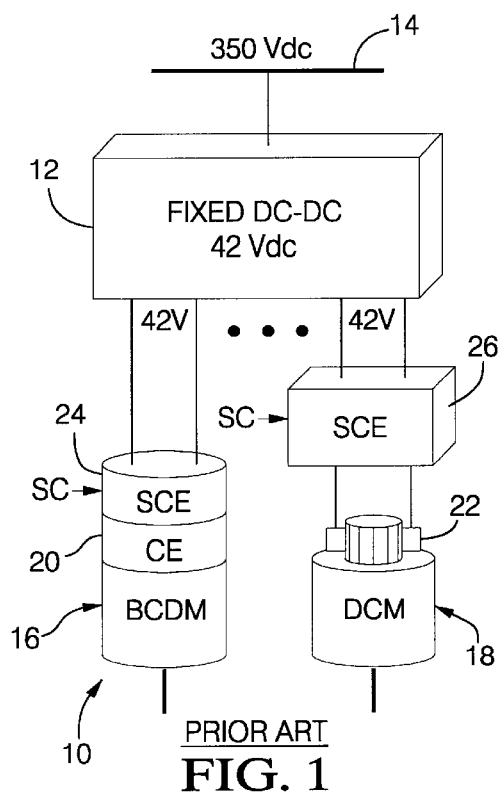
FIG. 1 is a block diagram of a prior art accessory motor drive power supply system that utilizes a DC-DC converter to provide a fixed 42 Vdc power supply bus for operating the various accessory drive motors used on an electric vehicle.
Figure 2:
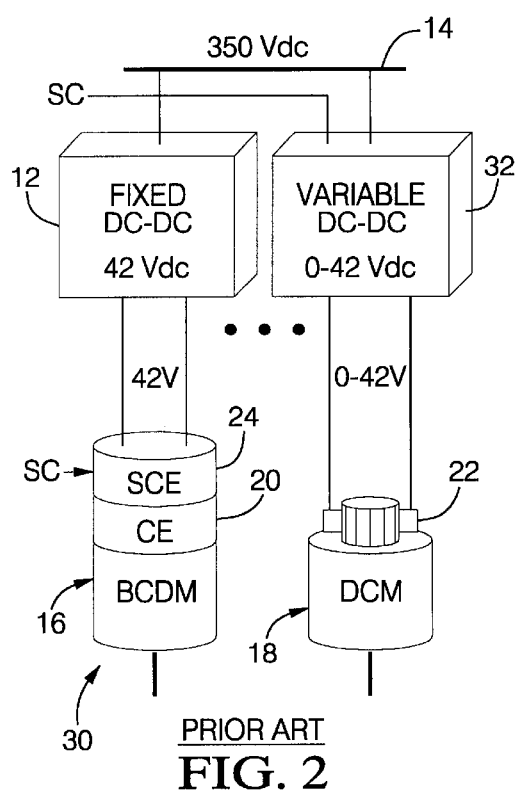
FIG. 2 is a block diagram of a second prior art power supply system that utilizes different power supply designs for both brush-type and brushless DC motors.

Before describing preferred embodiments of the invention, reference is made to FIGS. 1 and 2 which depict two known electric vehicle power supply systems that are designed to provide an intermediate DC voltage supply for both brush-type and brushless motors. In particular, FIG. 1 depicts a typical prior art accessory drive power supply system 10 that includes a single DC-DC converter 12 which produces a fixed 42 Vdc voltage supply using operating power drawn from a high voltage bus 14. The system includes a number of accessory drive motors including one or more brushless DC motors (BDCM) 16 and one or more brush-type DC motors (DCM) 18. The brushless motor 16 includes an integrated commutation electronics circuit 20, whereas commutation of the brush-type motor 18 is accomplished using brushes 22 to supply energizing current to the rotor coils within the motor.

To provide speed control, the brushless motor 16 includes speed control electronics 24 that receive both 42 Vdc operating power from the fixed supply 12 as well as a speed control input (SC) from a controller (not shown) for the system with which motor 16 is used. As is known, the speed control electronics 24 provide the commutation electronics 20 with a DC voltage that varies in accordance with the speed control signal. Since the motor speed varies with the DC voltage provided to the commutation electronics, the resulting motor speed will thus vary in accordance with the speed control signal. For the brush-type motor 18, speed control is accomplished using an external speed control module 26 that receives 42 Vdc operating power from fixed supply 12 along with its own speed control input signal (SC) from its associated controller (not shown), and generates a variable DC voltage that is provided to motor 18. As with the brushless motor's speed control electronics, the output voltage of external speed control module 26 varies in accordance with the speed control signal, thereby resulting in a variable motor speed that is determined by the speed control signal.

As mentioned above, vehicle power supply systems of the type shown in FIG. 1 do not provide an optimal solution to the need for an intermediate voltage supply. They utilize two separate stages of power conversion for each motor which is not only unnecessarily costly in terms of expense and physical space within the vehicle power electronics bay, but also results in the motors being run somewhat inefficiently at lower motor speeds and loads.

To avoid some of these disadvantages of power supply system 10, the circuit design of FIG. 2 abandons the single intermediate voltage supply rail concept and utilizes different power supply designs for the brush-type and brushless DC motors. In particular, the power supply system 30 of FIG. 2 includes a fixed 42 Vdc power supply design for the brushless motor 16 and a variable power supply design for the brush-type motor 18. As illustrated, the brushless motor 16 is operated using the same power supply and motor circuit shown in FIG. 1, including the fixed DC-DC converter 12 along with commutation electronics 20 and speed control electronics 24 that are integrated into the brushless motor 16. The variable power supply design for motor 18 eliminates the need for the separate speed control electronics module 26 of FIG. 1 by utilizing a variable power supply 32 that draws operating power from the high voltage bus 14 and converts it to a 0–42 Vdc variable output in accordance with the speed control input SC.

Although the system of FIG. 2 improves the operation of the brush-type motor 18 by eliminating a power conversion stage and the associated overhead in terms of cost, space, and inefficiency, it does nothing to improve the configuration of the brushless DC motor 16 and, moreover, results in a power supply system that utilizes different types of power supplies for the different types of electric motors.

Figure 3:
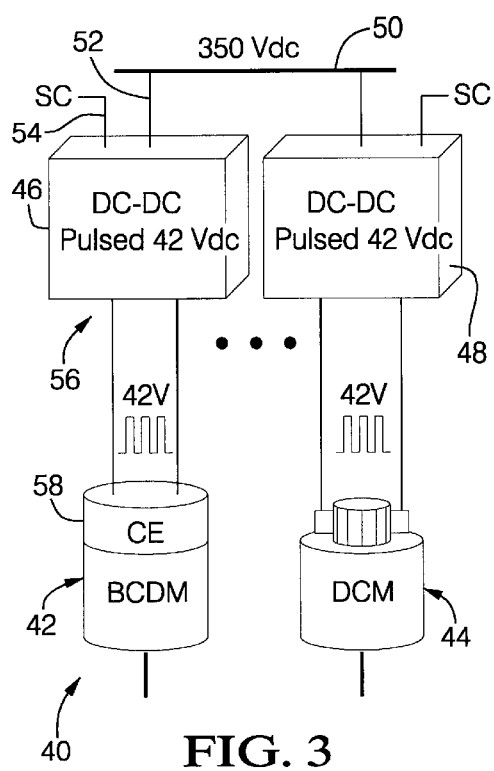
FIG. 3 is a block diagram of a first embodiment of an accessory motor drive power supply system of the present invention utilizing dedicated, but identical variable supply DC-DC converters to operate both brush-type and brushless DC motors.

The present invention overcomes many of the disadvantages of the power supply systems of FIGS. 1 and 2 by providing an overall system design which permits the use of a single power supply design while increasing the overall power conversion efficiency of the system and eliminating the cost and real estate associated with the separate speed control electronics used in the systems of FIGS. 1 and 2. In particular, FIG. 3 depicts a first embodiment of the invention in which the power supply system 40 includes at least one brushless and one brush-type electric motor 42, 44, respectively, each having a dedicated variable power supply 46, 48, respectively, that draws operating power from a high voltage bus 50. In general, each of the power supplies 46, 48 receives a speed control signal (SC) from its associated controller (not shown) and, using that signal, converts power from the high voltage bus 50 into a variable motor drive signal that is provided to its associated motor.

In particular, power supply 46 includes a power input 52, data input 54, and an output 56. Power input 52 is connected to high voltage bus 50. The data input 54 is connected to receive the speed control signal. Output 56 is a two-wire output that is connected to the commutation electronics 58 of motor 42. Power supply 46 is a pulse-width modulated DC-DC converter that outputs a PWM signal comprising a train of 42 volt pulses. The outputted pulses have a pulse width that is set in accordance with the speed control signal such that the greater the speed requested by the speed control signal, the wider the pulse width. The PWM converter 46 can be one that runs at a fixed or variable frequency and there are various suitable circuit designs that are well known to those skilled in the art. Also, it will be appreciated that, if desired, the power supply 46 can include a feedback signal from its output or a sensor on the motor itself to thereby provide closed loop control of motor speed. The design of the power supply 48 for the brush-type motor 44 can be and preferably is identical to that of power supply 46 and, accordingly, no further explanation of the construction and use of power supply 48 is necessary.

As will be appreciated, this single PWM converter design not only provides a voltage step-down function for safer and longer-lasting operation of the motors, but also provides variable motor speed control for both motors, thereby obviating the need for separate speed control electronics. This also has the effect of eliminating the second stage of power conversion for both motors, thereby increasing the overall system efficiency.

Figure 4:
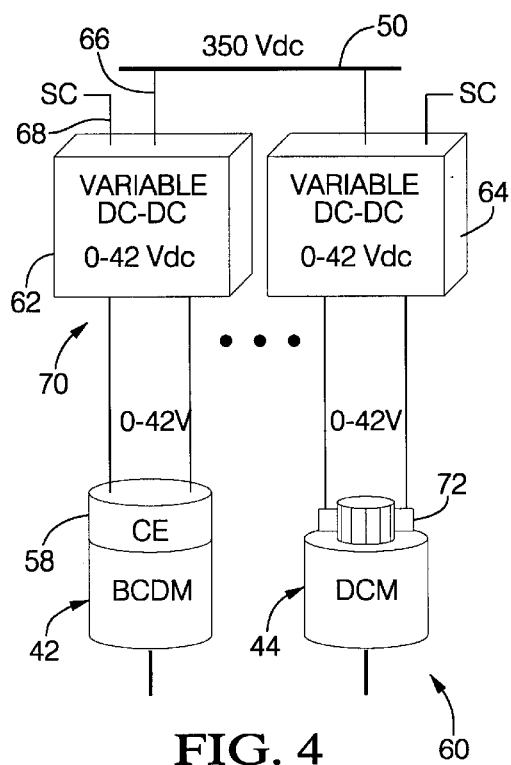
FIG. 4 is a block diagram of a second embodiment of an accessory motor drive power supply system of the present invention.

Referring now to FIG. 4, there is shown a second embodiment 60 of an accessory motor drive power supply system of the present invention. Power supply system 60 is similar to the system of FIG. 3 in that includes both the brushless and brush-type DC motors 42, 44, respectively, but differs in that it utilizes respective DC-DC converters 62, 64 which provide a 0–42 Vdc variable output instead of a PWM motor drive signal. More specifically, each of the power supplies 62, 64 includes a power input 66, data input 68, and an output 70 as in FIG. 3, with the power input 66 being connected to the high voltage bus 50, the data input 68 being connected to receive a speed control signal (SC) from its associated controller, and the output 70 being connected to its associated motor. The variable motor drive signal outputted by the DC-DC converters is, in the case of brushless DC motor 42, connected directly to its commutation electronics 58 and, in the case of the brush-type motor 44, is connected to its brush contacts 72.

DC-DC conversion using supplies 62 and 64 can be achieved using any of a number of different circuit designs including, for example, DC-DC resonant converters and switch mode power supplies. In the case of a switch mode power supply design, the power supply can be implemented using a PWM circuit having a duty cycle that is controlled using the speed control signal to thereby set the output voltage. Thus, a higher commanded speed using the speed control signal would result in a larger DC output voltage.

As in the system of FIG. 3, converters 62, 64 can be implemented using a single circuit design. In this regard, both the power supply systems 40 and 60 of FIGS. 3 and 4 can utilize a single speed control interface design for both the brushless and brush-type DC motors. In addition to the uniformity in converter design, the operation of the brushless motor from a variable power supply such as shown in FIGS. 3 and 4 results in significant costs savings since no separate speed control electronics are required on the motor itself. As a result, the brushless motor behaves like a conventional two-wire brush-type motor without the inherent disadvantages. The outputs can be filtered if desired to lower the EMI radiated by the power supplies. For reduced system cost, the outputs can be left unfiltered, in which case the motor windings will act to smooth the current somewhat.

Figure 5:
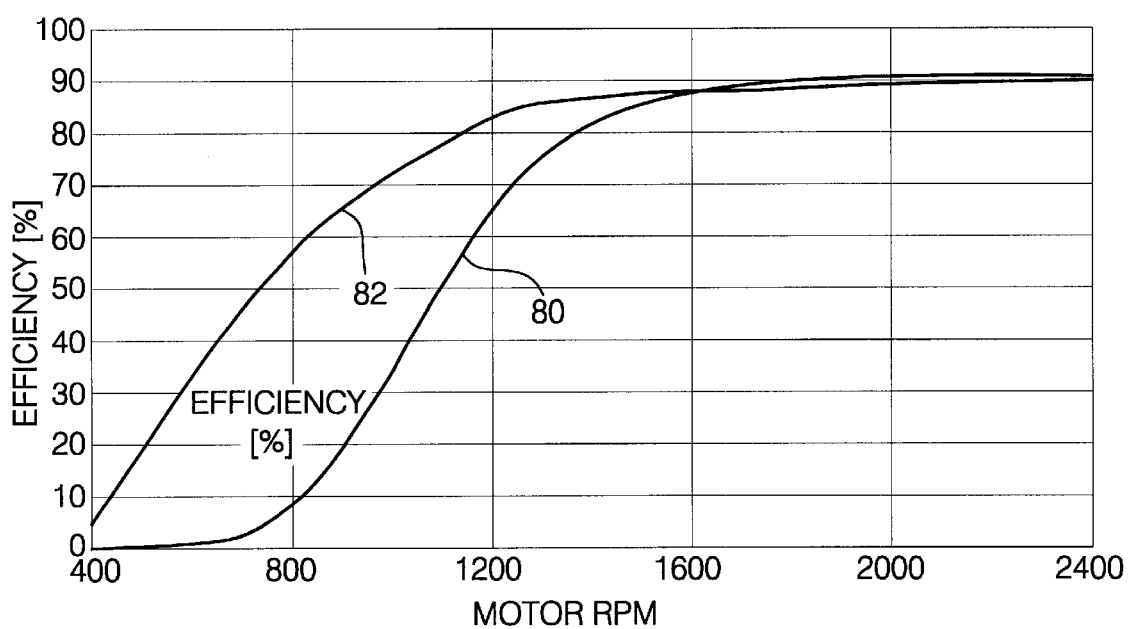
FIG. 5 is a chart depicting the efficiency gain that can be realized by using the system configuration of FIG. 3 in lieu of the prior art power supply system of FIG. 1.

Turning now to FIG. 5, there is shown an exemplary graph which depicts the improvement in efficiency obtained by the circuitry of FIGS. 3 and 4 versus that of FIGS. 1 and 2 for operation of a brushless motor used to operate a fan or blower on the vehicle. In this figure, the lower curve 80 represents the power conversion efficiency for a typical brushless DC motor control circuit constructed in accordance with FIGS. 1 and 2, whereas the upper curve 82 represents the power conversion efficiency for such a circuit constructed in accordance with either FIGS. 3 or 4. As shown, the conventional power supply topology of FIGS. 1 and 2 result in relatively low-efficiency power conversion at lighter loads when compared to that provided by the system of FIGS. 3 and 4. For example, at a motor speed of 800 rpms, the efficiency of the conventional circuit is approximately 10%, whereas it is greater than 55% for the circuit constructed in accordance with the present invention.

Accordingly, it should thus be apparent that there has been provided in accordance with the present invention an accessory motor drive power supply system that achieves the aims and advantages specified herein. It will of course be understood that the foregoing description is of preferred exemplary embodiments and that the invention is not limited to the specific embodiments shown. Various changes and modifications will become apparent to those skilled in the art. For example, as indicated by the ellipses in FIGS. 3 and 4, the power supply system of the present invention can include a number of additional brushless and/or brush-type motors along with a similar number of additional variable-output power supplies. All such changes and modifications are intended to come within the scope of the appended claims.

We claim:

1. An accessory motor drive power supply system for use in an electric vehicle to operate both brushless and brush-type DC motors from a high voltage bus, the motor drive power supply system comprising:

a first DC-DC converter having a power input for receiving operating power from the high voltage bus, a first speed control input for receiving a first speed control signal indicative of desired motor speed, and an output for providing a motor drive signal;

a brushless DC motor having a commutation circuit connected to said output of said first DC-DC converter;

a second DC-DC converter having a power input for receiving operating power from the high voltage bus, a second speed control input for receiving a second speed control signal indicative of desired motor speed, and an output for providing a motor drive signal, and a brush-type DC motor connected to said output of said second DC-DC converter, wherein each of said first and second DC-DC converters is operable in response to the speed control signal received on its speed control input to convert operating power from the high voltage bus into a variable motor drive signal that is provided to its associated motor via its output, whereby speed control of each of said DC motors is carried out by a DC-DC converter operating off the high voltage bus.

2. An accessory motor drive power supply system as defined in claim 1, wherein said first and second DC-DC converters each comprise a pulse-width modulated DC-DC converter that outputs a variable motor drive signal comprising a train of pulses having a pulse width determined in accordance with the speed control signal received on its speed control input.

3. An accessory motor drive power supply system as defined in claim 1, wherein said first and second DC-DC converters each comprise a variable voltage DC-DC converter that outputs a variable motor drive signal comprising a DC voltage having a magnitude that varies in accordance with the speed control signal received on its speed control input.

4. An accessory motor drive power supply system as defined in claim 3, wherein said first and second DC-DC converters each comprise a switch mode power supply having a variable duty cycle that is controlled using the speed control signal received on its speed control input.

5. An accessory motor drive power supply system as defined in claim 1, wherein the output of at least one of said converters comprises a filtered output.

6. An accessory motor drive power supply system as defined in claim 1, further comprising at least one additional DC-DC converter having a power input for receiving operating power from the high voltage bus and a speed control input for receiving a speed control signal indicative of desired motor speed.

7. An accessory motor drive power supply system as defined in claim 1, wherein said first DC-DC converter generates its variable motor drive signal using a selected circuit design and wherein said second DC-DC converter generates its variable motor drive signal using said selected circuit design, whereby a single DC-DC converter circuit design can be used to provide speed control of both said brushless and brush-type motors.

8. An accessory motor drive power supply system as defined in claim 7, wherein said first DC-DC converter and said second DC-DC converter are identical.

9. An accessory motor drive power supply system as defined in claim 7, wherein said first DC-DC converter has a first speed control interface that includes said first speed control input, and wherein said second DC-DC converter has a second speed control interface that includes said second speed control input.

10. An accessory motor drive power supply system as defined in claim 9, wherein said first and second speed control interfaces are the same.

* * * * *